(12) United States Patent
Tang

(10) Patent No.: US 11,304,211 B2
(45) Date of Patent: Apr. 12, 2022

(54) POWER ALLOCATION METHOD AND DEVICE

(71) Applicant: Guangdong OPPO Mobile Telecommunications Corp., Ltd., Guangdong (CN)

(72) Inventor: Hai Tang, Guangdong (CN)

(73) Assignee: GUANGDONG OPPO MOBILE TELECOMMUNICATIONS CORP., LTD., Dongguan (CN)

(*) Notice: Subject to any disclaimer, the term of this patent is extended or adjusted under 35 U.S.C. 154(b) by 452 days.

(21) Appl. No.: 16/338,802

(22) PCT Filed: Nov. 28, 2017

(86) PCT No.: PCT/CN2017/113396
§ 371 (c)(1),
(2) Date: Apr. 2, 2019

(87) PCT Pub. No.: WO2019/104485
PCT Pub. Date: Jun. 6, 2019

(65) Prior Publication Data
US 2021/0329657 A1   Oct. 21, 2021

(51) Int. Cl.
*H04W 72/10* (2009.01)
*H04W 4/40* (2018.01)
(Continued)

(52) U.S. Cl.
CPC ............ *H04W 72/10* (2013.01); *H04W 4/40* (2018.02); *H04W 52/367* (2013.01); *H04W 72/0453* (2013.01); *H04W 72/0473* (2013.01)

(58) Field of Classification Search
None
See application file for complete search history.

(56) References Cited

U.S. PATENT DOCUMENTS

2016/0044694 A1* 2/2016 Park ..................... H04W 72/10
                                                       370/329
2020/0053675 A1* 2/2020 Khoryaev ........... H04W 56/002

FOREIGN PATENT DOCUMENTS

CN    102257869 A    11/2011
CN    102300305 A    12/2011
(Continued)

OTHER PUBLICATIONS

NOKIA: "Tx Power Allocation in SL CA" 3GPP TSG-RAN WG1 Meeting #91; R1-1720486 Reno, USA, Nov. 27-Dec. 1, 2017, XP051370030.
(Continued)

*Primary Examiner* — Kouroush Mohebbi
(74) *Attorney, Agent, or Firm* — Young Basile Hanlon & MacFarlane, P.C.

(57) ABSTRACT

A power allocation method and a device are provided. The method is applied to a first device supporting data transmission through N carriers on a sidelink. The method includes: determining that service priority levels of N1 carriers of the N carriers are less than a threshold; determining, from the N carriers, N2 carriers and a transmission power of each of the N2 carriers, wherein a total transmission power of the N2 carriers is less than or equal to a maximum transmission power of the first device; and sending a service on a corresponding carrier to a second device according to the transmission power of each of the N2 carriers.

18 Claims, 3 Drawing Sheets

(51) Int. Cl.
*H04W 52/36* (2009.01)
*H04W 72/04* (2009.01)

(56) References Cited

FOREIGN PATENT DOCUMENTS

| CN | 107211263 A | 9/2017 |
|---|---|---|
| WO | 2010091425 A2 | 8/2010 |
| WO | 2016089185 A1 | 6/2016 |

OTHER PUBLICATIONS

Extended European search report issued in corresponding European application No. 17922915.8 dated Sep. 25, 2019.
English translation of first Chinese Office Action 201780048081.4 dated Apr. 29, 2020.

\* cited by examiner

POWER ALLOCATION METHOD AND
DEVICE

CROSS-REFERENCE TO RELATED APPLICATION(S)

This application is a 371 application of International Application No. PCT/CN2017/113396, filed on Nov. 28, 2017, the entire disclosure of which is hereby incorporated by reference.

TECHNICAL FIELD

Implementations of the present disclosure relate to the field of communications, and more particularly, to a power allocation method and a device.

BACKGROUND

A Vehicle to Everything (V2X) system is a Sidelink (SL) transmission technology based on Long Term Evaluation Vehicle to Vehicle (LTE D2D). Different from a traditional LTE system in which communication data are received or sent through a base station, the V2X system adopts a direct communication mode of terminal-to-terminal, and thus the V2X system has higher spectral efficiency and lower transmission delay.

In Release (Rel)-14 of 3rd Generation Partnership Project (3GPP), a terminal may perform an uplink data transmission and a sidelink data transmission. The terminal transmits data with a network on an uplink, and transmits data with other terminals on a sidelink. When uplink transmission and sidelink transmission are overlapped in time, power allocation is performed according to a priority level of a service on a measured link. The network may configure a priority level threshold (or the priority level threshold is a pre-configured priority level threshold). When a priority level of sidelink data is less than the threshold, the terminal will ensure transmission of the sidelink data, and discard the uplink transmission or reduce a power of the uplink transmission. When a priority level of the sidelink service is greater than or equal to the threshold, the terminal will ensure the transmission of the uplink data, discard the transmission of the sidelink data or reduce a power of the sidelink data.

However, sidelink multi-carrier transmission is supported in Rel-15, and the terminal may select one or more carriers from multiple candidate carriers for data transmission.

It can be seen that when multiple sidelink data transmissions and the uplink data transmission are overlapped in time, and a total power of data transmissions exceeds a maximum transmission power of the terminal, how to perform power allocation is a problem needed to be solved.

SUMMARY

A power allocation method and a device are provided.

In a first aspect, a power allocation method is provided. The method is applied to a first device, and the first device supports data transmission through N carriers on a sidelink. The method includes: the first device determines that service priority levels of N1 carriers of the N carriers are less than a threshold;

the first device determines, from the N carriers, N2 carriers and a transmission power of each of the N2 carriers, wherein a total transmission power of the N2 carriers is less than or equal to a maximum transmission power of the first device; and the first device sends a service on a corresponding carrier to a second device according to the transmission power of each of the N2 carriers.

In some possible implementations, determining, by the first device, from the N carriers, the N2 carriers and the transmission power of each of the N2 carriers includes:

the first device determines the N2 carriers according to a following way until a remaining transmission power of the first device is zero, or until all of the N carriers are added to an available carrier set.

The first device determines a first carrier of which a service priority level is lowest in a candidate carrier set. If a transmission power of the first carrier is greater than or equal to the remaining transmission power, the first device determines the remaining transmission power as a transmission power of the first carrier, wherein the remaining transmission power is equal to a power obtained by subtracting a total transmission power of all carriers in the available carrier set from the maximum transmission power, adds the first carrier to the available carrier set, and removes the first carrier from the candidate carrier set. If the transmission power of the first carrier is less than the remaining transmission power, the first device adds the first carrier to the available carrier set and removes the first carrier from the candidate carrier set.

In some possible implementations, before the first device determines the N2 carriers, the method further includes:

the first device determines the candidate carrier set and the available carrier set.

In some possible implementations, determining, by the first device, the candidate carrier set and the available carrier set includes: the first device determines an empty set as the available carrier set, and uses the N carriers as the candidate carrier set.

In some possible implementations, determining, by the first device, the candidate carrier set and the available carrier set includes: if a total transmission power of the N1 carriers is greater than or equal to the maximum transmission power, the first device determines an empty set as the available carrier set, and determines the N1 carriers as the candidate carrier set.

In some possible implementations, determining, by the first device, the candidate carrier set and the available carrier set includes: if a total transmission power of the N1 carriers is less than the maximum transmission power, the first device determines the N1 carriers as the available carrier set, and determines carriers except the N1 carriers in the N carriers as the candidate carrier set.

In some possible implementations, determining, by the first device, the first carrier of which the service priority level is lowest in the candidate carrier set includes: if carriers of which service priority levels are lowest in the candidate carrier set includes multiple second carriers, the first device determines the first carrier from the second carriers.

In some possible implementations, determining, by the first device, the first carrier from the multiple second carriers, includes: the first device randomly selects one carrier from the multiple second carriers as the first carrier.

In some possible implementations, determining, by the first device, the first carrier from the multiple second carriers, includes: the first device determines the multiple second carriers as the first carrier.

In some possible implementations, determining, by the first device, from the N carriers, the N2 carriers and the transmission power of each of the N2 carriers includes: if a total transmission power of the N1 carriers is greater than the maximum transmission power, the first device determines the N1 carriers as the N2 carriers; and the first device determines the transmission power of each of the N2 carriers according to a proportional coefficient; wherein the proportional coefficient includes a coefficient of the transmission power of each of the N2 carriers.

In some possible implementations, the proportional coefficient is a coefficient configured by a network device, or the proportional coefficient is a coefficient determined by the first device according to a service priority level of each of the N2 carriers.

In a second aspect, a device supporting data transmission through N carriers on a sidelink is provided. The device includes a determining unit and a transceiver unit.

The determining unit is used for: determining that service priority levels of N1 carriers of the N carriers are less than a threshold; determining, from the N carriers, N2 carriers and a transmission power of each of the N2 carriers, wherein a total transmission power of the N2 carriers is less than or equal to a maximum transmission power of the device.

The transceiver unit is used for sending a service on a corresponding carrier to a second device according to the transmission power of each of the N2 carriers.

In a third aspect, a device supporting data transmission through N carriers on a sidelink is provided. The device includes a processor and a transceiver.

The processor is used for determining that service priority levels of N1 carriers of the N carriers are less than a threshold; and determining, from the N carriers, N2 carriers and a transmission power of each of the N2 carriers, wherein a total transmission power of the N2 carriers is less than or equal to a maximum transmission power of the device.

The transceiver is used for sending a service on a corresponding carrier to a second device according to the transmission power of each of the N2 carriers.

In a fourth aspect, a computer readable medium is provided. The computer readable medium is used for storing a computer program. The computer program includes instructions for executing the above method examples.

In a fifth aspect, a computer chip is provided. The computer chip includes an input interface, an output interface, at least one processor, and a storage. The at least one processor is used for executing codes in the storage. When the codes are executed, the processor may implement various processes executed by a first device in the above method examples.

In a sixth aspect, a communication system including the above devices is provided.

DETAILED DESCRIPTION

Technical solutions in implementations of the present disclosure will be described with reference to the accompanying drawings.

The implementations of the present disclosure may be applied to any communication architecture of terminal device to terminal device. For example, Vehicle to Vehicle (V2V), Vehicle to Everything (V2X), Device to Device (D2D), etc.

Figure 1:
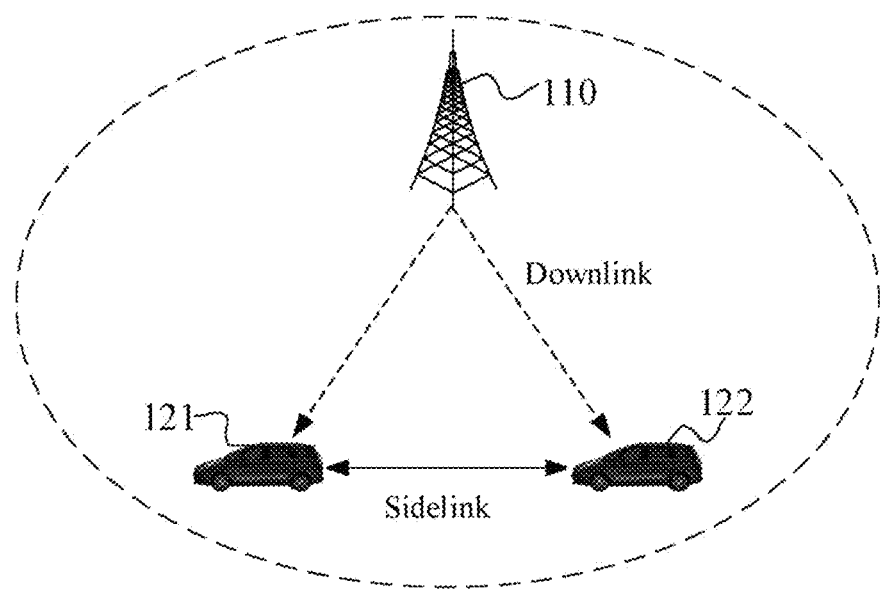
FIG. 1 is a schematic diagram of architecture of a transmission mode according to an implementation of the present disclosure.
Figure 2:
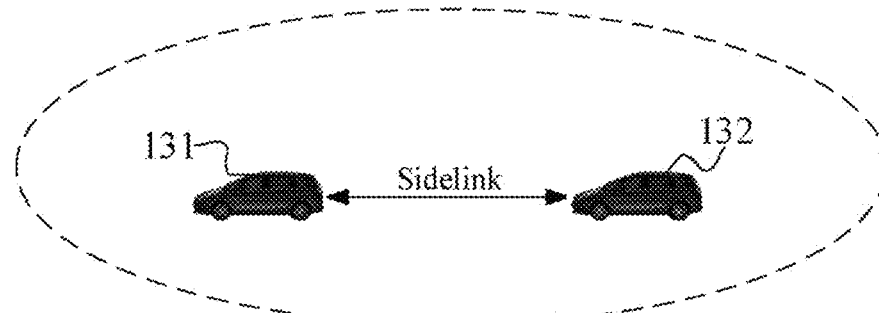
FIG. 2 is a schematic diagram of architecture of another transmission mode according to an implementation of the present disclosure.

For example, the implementations of the present disclosure may be applied to Rel-14 of the 3GPP, in which two transmission modes, namely, mode 3 and mode 4 are defined for the Vehicle to Everything (V2X) technology. Specifically, in mode 3, as shown in FIG. 1, transmission resources of vehicle user equipments (VUE) (VUE 121 and VUE 122) are allocated by a base station 110, and the VUEs send data on a sidelink according to the resources allocated by the base station 110. The base station 110 may allocate resources for a single transmission to a user equipment, or allocate transmission resources to the user equipment in a semi-static way. In mode 4, as shown in FIG. 2, VUEs (VUE 131 and VUE 132) adopt a transmission mode of sensing and reservation. Specifically, the VUE acquires an available transmission resource set in a resource pool by a sensing mode, and the VUE randomly selects a resource from the set for data transmission.

It should be understood that the system architecture of VUE to VUE shown in FIG. 1 and FIG. 2 is only examples of implementations of the present disclosure, and the implementations of the present disclosure are not limited thereto.

It should also be understood that a terminal device in implementations of the present disclosure may be any device or apparatus configured with a physical layer and a media access control layer, and the terminal device may also be referred to as an access terminal, for example, a user equipment (UE), a subscriber unit, a subscriber station, a mobile site, a mobile station, a remote station, a remote terminal, a mobile device, a user terminal, a terminal, a wireless communication device, a user agent, or a user apparatus. The access terminal may be a cellular phone, a cordless phone, a Session Initiation Protocol (SIP) phone, a Wireless Local Loop (WLL) station, a Personal Digital Assistant (PDA), a handheld device with a radio communication function, a computing device, or other linear processing devices connected to a wireless modem, a vehicle-mounted device, a wearable device, or the like. The implementation of the present disclosure is described by taking a vehicle user equipment (VUE) as an example, but are not limited thereto.

In an implementation of the present disclosure, when a terminal device senses a resource pool, a resource pool with a short transmission time interval (short TTI) is introduced on the basis of a traditional resource pool with a long TTI. In other words, in a sensing method of the implementations of the present disclosure, when the terminal device needs to select resources, if there are both a short TTI resource pool and a long TTI resource pool, the terminal device may selectively sense a resource pool.

However, in Rel-14, the terminal device may perform uplink data transmission and sidelink data transmission. The terminal device transmits data with a network on an uplink, and transmits data with other terminal devices on a sidelink. When the uplink transmission and the sidelink transmission are overlapped in time, power allocation is performed according to a priority level of a service on a measured link. The network may configure a priority level threshold (or the priority level threshold is a pre-configured priority level threshold). When a priority level of sidelink data is less than the threshold, the terminal device will ensure transmission of the sidelink data, and discard the uplink transmission or reduce a power of the uplink transmission. When a priority level of the service on the sidelink is greater than or equal to the threshold, the terminal device will ensure the transmission of the uplink data, discard the transmission of the sidelink data or reduce a power of the sidelink data.

However, multi-carrier transmission on the sidelink is supported in Rel-15, and the terminal device may select one or more carriers from candidate carriers for data transmission.

It may be seen that assuming that there are N sidelink services to be transmitted at the same time, priority levels of N1 services are less than the threshold, priority levels of N3 services are greater than or equal to the threshold, and N=N1+N3. If the mechanism in Rel-14 continues to be used, a priority level threshold is set, when there is a carrier, on the sidelink, of which a priority level is lower than the threshold, uplink data transmission will be discarded, which at least causes the following two problems.

1. If the priority levels of N1 sidelink services are all less than the threshold, but a total transmission power required by these N1 sidelink services exceeds a maximum transmission power of the terminal device, there is a problem of how to perform power allocation among these services.

2. If all priority levels of N1 sidelink services are less than the threshold, but a total transmission power required by the N1 sidelink services is less than the maximum transmission power of the terminal device, if only data of the N1 sidelink service are transmitted, the maximum transmission power of the terminal device cannot be fully utilized, thus causing resource waste.

That is, when multiple sidelink data transmission and uplink data transmission are overlapped in time, and a total power of data transmission exceeds the maximum transmission power of the terminal device, how to perform the power allocation is a problem needed to be solved.

To solve the above problems, an implementation of the present disclosure provides a power allocation method, which solves a problem of the power allocation of multiple carriers on a sidelink of the device.

Figure 3:
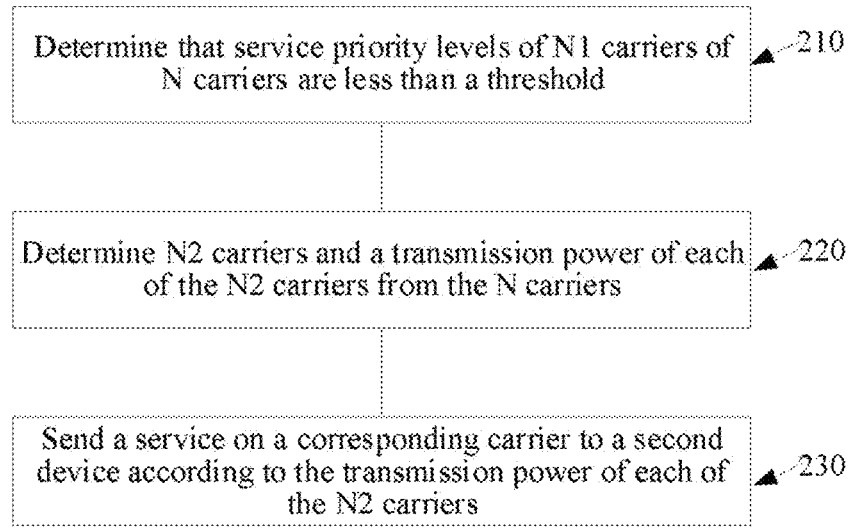
FIG. 3 is a schematic flowchart of a power allocation method according to an implementation of the present disclosure.

Specifically, as shown in FIG. 3, the method includes following contents.

In 210, it is determined that service priority levels of N1 carriers of N carriers are less than a threshold.

In 220, N2 carriers and a transmission power of each of the N2 carriers of the N carriers are determined.

In 230, a service on a corresponding carrier is sent to a second device according to the transmission power of each of the N2 carriers.

Specifically, a first device determines that the service priority levels of the N1 carriers of the N carriers are less than the threshold. The first device determines the N2 carriers and the transmission power of each of the N2 carriers from the N carriers, wherein N2≤N, and the total transmission power of the N2 carriers is less than or equal to the maximum transmission power of the first device. The first device sends the service on the corresponding carrier to the second device according to the transmission power of each of the N2 carriers.

In the implementation of the present disclosure, since both N1 carriers and N2 are carriers in N carriers, thereby N1≤N and N2≤N. However, the implementations of the present disclosure do not limit sizes of N1 and N2. For example, N1 may be greater than N2. For another example, N1 may be equal to N2. For another example, N1 may be less than N2.

According to the power allocation of the implementations of the present disclosure, the first device is triggered to determine the N2 carriers and the transmission power of each of the N2 carriers from the N carriers through the N1 carriers of which the service priority levels are lower than the threshold, thus effectively solving the problem of how to perform the power allocation when the first device simultaneously performs the sending on the sidelink and the uplink in a multi-carrier scenario.

It should be noted that in an implementations of the present disclosure, a priority level of a service is inversely proportional to a priority of the service. That is, the lower the service priority level is, the higher the service priority is. For example, eight priority levels from 0 to 7 are defined in Rel-14, a priority level 0 indicates a highest priority and a priority level 7 indicates a lowest priority.

It should be understood that the first device in the implementations of the present disclosure may be the VUE 121 or the VUE 122 as shown in FIG. 1, or may be the VUE 131 and the VUE 132 as shown in FIG. 2. The implementations of the present disclosure are not specifically limited thereto.

The following is an exemplary description of Implementations of determining, by the first device, from the N carriers, the N2 carriers and the transmission power of each of the N2 carriers will be exemplary illustrated below.

In an implementation, the first device may determine the N2 carriers according to following mode until a remaining transmit power of the first device is zero, or until all of the N carriers are added to an available carrier set.

The first device determines a first carrier of which a service priority level is lowest in a candidate carrier set. If a transmission power of the first carrier is greater than or equal to the remaining transmission power, the first device determines the remaining transmission power as the transmission power of the first carrier, herein the remaining transmission power is equal to a power obtained by subtracting a total transmission power of all carriers in the available carrier set from a maximum transmission power, adds the first carrier to the available carrier set, and removes the first carrier from the candidate carrier set. If the transmission power of the first carrier is less than the remaining transmission power, the first device adds the first carrier to the available carrier set and removes the first carrier from the candidate carrier set.

Further, before determining the N2 carriers, the first device needs to determine the candidate carrier set and the available carrier set according to following mode.

For example, the first device may determine an empty set as the available carrier set and use the N carriers as the candidate carrier set. That is, if the service priority levels of the N1 carriers are all less than the threshold, the first device may determine an empty set as the available carrier set, and the N carriers as the candidate carrier set.

Specifically, the first device may determine the N2 carriers according to following acts 11-13.

In act 11, the first device uses the N carriers as a candidate carrier set, uses an empty set as an available carrier set, wherein a remaining power of the first device is a maximum transmission power.

In act 12, the first device selects a carrier of which a service priority level is lowest in the candidate carrier set.

In act 13, the first device determines whether a transmission power of the carrier is greater than the remaining power of the first device.

If the transmission power of the carrier is greater than or equal to the remaining power, the first device sends a service of the carrier with the remaining power; and puts the carrier into the available carrier set.

If the transmission power of the carrier is less than the maximum transmission power, the carrier is removed from the candidate carrier set and added to the available carrier set. A remaining power obtained by subtracting the transmission power of the carrier from the maximum transmission power of the first device is used as the remaining power of the first device, and steps 12 and 13 are repeated, until the remaining power of the first device is zero, or until all of the N carriers are added to the available carrier set.

For another example, if a total transmission power of N1 carriers is less than a maximum transmission power, the first device may determine the N1 carriers as an available carrier set, and determine carriers except the N1 carriers in the N carriers as a candidate carrier set. That is, if there are N1 carriers of which service priority levels are all less than the threshold, and a total transmission power required by the N1 services is less than a total transmission power of the first device, the first device may determine the N1 carriers as the available carrier set, and determine carriers except the N1 carriers in the N carriers as the candidate carrier set.

Specifically, it is assumed that there are N sidelink services to be transmitted at the same time, priority levels of N1 services are less than the threshold, priority levels of N3 services are greater than or equal to the threshold, and N=N1+N3. The first device may determine N2 carriers according to following acts 20-23.

In act 20, the first device may determine the N1 carriers as the available carrier set, and use the N3 carriers as the candidate carrier set.

In act 21, the first device selects a carrier of which a service priority level is lowest in the candidate carrier set, for example, a carrier K.

In act 22, the first device determines whether a total power of the N1 carriers and the carrier K exceeds the maximum transmission power of the first device.

In act 23, if the total power exceeds the maximum transmission power of the first device:

the first device adds the carrier K to the available carrier set, removes the carrier K from the candidate carrier set, and determines a transmission power of the carrier K as:

$$P\_K = P - \sum_{i=1}^{L} P\_L$$

Wherein, P_1, P_2, . . . P_L are respectively a transmission power required by each carrier in the available carrier set, P is a maximum transmission power of the first device, and L is the number of carriers in the available carrier set.

If the total power does not exceed the maximum transmission power of the first device, then it indicates that the first device may simultaneously send data on L carriers and data on the carrier K, wherein L is the number of carriers in the available carrier set, thereby the first device adds the carrier K to the available carrier set, removes the carrier K from the candidate carrier set, and acts 21, 22, and 23 are repeated, until the remaining power of the first device is zero, or until all of the N carriers are added to the available carrier set.

For another example, if the total transmission power of the N1 carriers is greater than or equal to the maximum transmission power, the first device may determine an empty set as an available carrier set and the N1 carriers as a candidate carrier set. That is, if all the service priority levels of the N1 carriers are less than the threshold, and a total transmission power required by the N1 services is greater than or equal to the total transmission power of the first device, the first device may determine the empty set as the available carrier set, and the N1 carriers as the candidate carrier set. In other words, the first device needs to preferentially ensure a transmission power of a carrier of which a service priority level is lowest in the N1 carriers. If the power is remaining, carriers of which priority levels are lower are selected from the remaining carriers for transmission, and the process is repeated, until a total transmission power of selected carriers is equal to the maximum transmission power of the first device. More specifically, the manner for the first device to determine the N2 carriers based on the N1 carriers is similar to the above acts 12 and 13 (or the above acts 21, 22 and 23), and will not be repeated here to avoid repetition.

It should be noted that in the above implementations, when the first device determines the first carrier of which the service priority level is lowest in the candidate carrier set, if there are M carriers with a same service priority level in the carrier selection process, the processing may be performed as follows.

For example, assuming that the carriers of which with the service priority level are lowest in the candidate carrier set include multiple second carriers, the first device determines a first carrier from the multiple second carriers.

By way of a non-limited example, the first device may randomly select one carrier from the multiple second carriers as the first carrier.

By way of a non-limited example, the first device may determine the multiple second carriers as the first carriers. Further, a transmission power of each of the multiple second carriers may be the same or different. For example, when the total transmission power of the multiple second carriers is greater than the remaining transmission power of the first device, a transmission power of each of the multiple second carriers may be determined according to a proportional coefficient, or the multiple second carriers may also divide the remaining transmission power equally.

For example, the transmission power of each of the multiple second carriers is:

$$P\_K = \frac{P - \sum_{i=1}^{L} P\_L}{M}$$

Wherein, M is the number of the multiple second carriers, P_1, P_2, . . . P_L are a transmission power respectively required by each carrier in the available carrier set, P is a maximum transmission power of the first device, and L is the number of carriers in the available carrier set.

In another implementation, if a total transmission power of the N1 carriers is greater than the maximum transmission power, the first device determines the N1 carriers as the N2 carriers; and the first device may determine a transmission power of each of the N2 carriers according to a proportional coefficient. The proportional coefficient includes a ratio of the transmission power of each carrier of the N2 carriers.

Specifically, the first device determines whether the total transmission power required on N1 carriers of which priority levels are lower than the threshold is less than the maximum transmission power of the first device. If the total transmission power required on the N1 carriers is greater than the maximum transmission power of the first device, the first device configures the N1 carriers with power allocation factors, and transmits data on the N1 carriers with corresponding powers.

For example, the first device configures the N1 carriers with proportional coefficients respectively, i.e., X_1, X_2, ... X_N1, so that $$\sum_{i=1}^{N_1} X\_i * P\_i \le P.$$

Further, the proportional coefficients are coefficients configured by a network device.

It should be understood that the implementation of the present disclosure does not specifically limit the mode by which the proportional coefficients are obtained.

For example, the proportional coefficients may also be independently selected by the terminal device. For example, the proportional coefficients are coefficients determined by the first device according to the service priority level of each of the N2 carriers. For example, the lower the priority level is, the higher the corresponding proportional coefficient is.

Figure 4:
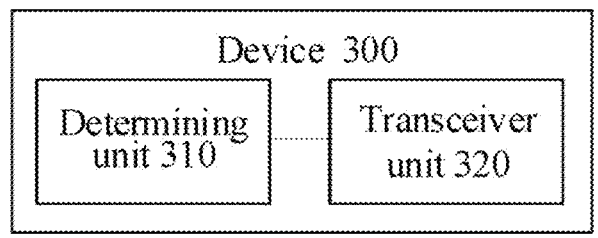
FIG. 4 is a block diagram of a device according to an implementation of the present disclosure.

FIG. 4 is a block diagram of a first device according to an implementation of the present disclosure. It should be understood that the device supports data transmission through N carriers on a sidelink.

Specifically, as shown in FIG. 4, the device 300 includes a determining unit 310 and a transceiver unit 320.

The determining unit 310 is used for determining that service priority levels of N1 carriers from N carriers are less than a threshold; and determining, from the N carriers, N2 carriers and a transmission power of each of the N2 carriers, wherein a total transmission power of the N2 carriers is less than or equal to a maximum transmission power of the device.

The transceiver unit 320 is used for sending a service on a corresponding carrier to a second device according to the transmission power of each of the N2 carriers.

Optionally, the above determining unit 310 is specifically used for determining the N2 carriers according to a following way, until a remaining transmission power of the device is zero, or until all of the N carriers are added to an available carrier set: determining a first carrier of which a service priority level is lowest in in a candidate carrier set; if a transmission power of the first carrier is greater than or equal to the remaining transmission power, determining the remaining transmission power as the transmission power of the first carrier, herein the remaining transmission power is equal to a power obtained by subtracting the total transmission power of all carriers in the available carrier set from the maximum transmission power, adding the first carrier to the available carrier set, and removing the first carrier from the candidate carrier set; if the transmission power of the first carrier is less than the remaining transmission power, adding the first carrier to the available carrier set and removing the first carrier from the candidate carrier set.

Optionally, the above determining unit 310 is further used for, before determining the N2 carriers, determining the candidate carrier set and the available carrier set according to following mode.

Optionally, the above determining unit 310 is specifically used for determining an empty set as the available carrier set and using the N carriers as the candidate carrier set.

Optionally, the above determining unit 310 is specifically used for, if the total transmission power of the N1 carriers is greater than or equal to the maximum transmission power, determining an empty set as the available carrier set and the N1 carriers as the candidate carrier set.

Optionally, the above determining unit 310 is specifically used for, if the total transmission power of the N1 carriers is smaller than the maximum transmission power, determining the N1 carriers as the available carrier set and carriers except the N1 carriers in the N carriers as the candidate carrier set.

Optionally, the above determining unit 310 is specifically used for, if the carriers of the service priority levels are lowest in the candidate carrier set includes multiple second carriers, determining the first carrier from the multiple second carriers.

Optionally, the above determining unit 310 is specifically used for randomly selecting one carrier from the multiple second carriers as the first carrier.

Optionally, the above determining unit 310 is specifically used for determining the multiple second carriers as the first carrier.

Optionally, the above determining unit 310 is specifically used for, if the total transmission power of the N1 carriers is greater than the maximum transmission power, determining the N1 carriers as the N2 carriers; and determining a transmission power of each of the N2 carriers according to a proportional coefficient, wherein the proportional coefficient includes a ratio of a transmission power of each of the N2 carriers.

Optionally, the proportional coefficient is a coefficient configured by a network device, or the proportional coefficient is a coefficient determined by the device according to the service priority level of each of the N2 carriers.

Figure 5:
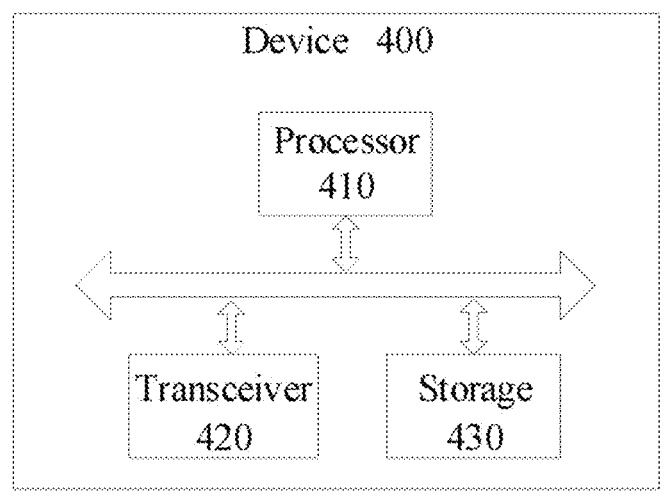
FIG. 5 is a block diagram of another device according to an implementation of the present disclosure.

It should be noted that the processing unit 310 may be implemented by a processor, and the transceiver unit 320 may be implemented by a transceiver. As shown in FIG. 5, a device 400 may include a processor 410, a transceiver 420, and a storage 430. The storage 430 may be used for storing indication information, or may be used for storing codes, instructions, etc., executed by the processor 410. The various components in the device 400 are connected through a bus system. In addition to a data bus, the bus system further includes a power bus, a control bus, a status signal bus, etc.

The device 400 shown in FIG. 5 can implement the various processes implemented by the first device in the method examples of FIGS. 1 to 3 described above, and will not be described here in order to avoid repetition.

In the implementation process, each act of the method examples in the implementations of the present disclosure may be completed by an integrated logic circuit of hardware in the processor or an instruction in the form of software. More specifically, the acts of the method disclosed in connection with the implementations of the present disclosure may be directly embodied as completion through the execution of a hardware decoding processor or completion through the execution in the combination of hardware and software modules in the decoding processor. Software modules may be located in a typical storage medium in the art, such as, a random access memory (RAM), a flash memory, a read-only memory, a programmable read-only memory, an electrical erasable programmable memory, or a register. The storage medium is located in the storage, and the processor reads the information in the storage and completes the acts of the above method in combination with its hardware.

Herein, the processor may be an integrated circuit chip with a capability for processing signals, and may implement various methods, acts and logic block diagrams disclosed in the implementations of the present disclosure. For example, the above processor may be a general purpose processor, a digital signal processor (DSP), an application specific integrated circuit (ASIC), a field programmable gate array (FPGA) or other programmable logic devices, a transistor logic device, or a discrete hardware component, or the like. Furthermore, the general purpose processor may be a microprocessor or the processor may be any conventional processor or the like.

In addition, the storage in implementations of the present disclosure may be a transitory memory or non-transitory memory, or may include both the transitory memory and the non-transitory memory. The non-transitory memory may be a read-only memory (ROM), a programmable ROM (PROM), an erasable PROM (EPROM), an electrically erasable EPROM (EEPROM), or a flash memory. The transitory memory may be a random access memory (RAM) which serves as an external cache. It should be understood that the above-mentioned storages are exemplary but not limiting. For example, the storage in the implementations of the present disclosure may also be a static random access memory (SRAM), a dynamic random access memory (DRAM), a synchronous dynamic random access memory (SDRAM), a double data rate SDRAM (DDR SDRAM), an enhanced SDRAM (ESDRAM), a Synch link DRAM (SLDRAM) and a Direct Rambus RAM (DR RAM), etc. That is, the storages of the systems and methods described herein are intended to include, but are not limited to, these and any other suitable types of memories.

Finally, it should be noted that the terms used in the implementations of the present disclosure and the appended claims are for the purpose of describing specific implementations only and are not intended to limit the implementations of the present disclosure.

For example, the singular forms "a", "said", and "the" used in the implementations of the present disclosure and the appended claims are also intended to include the plural forms unless the context clearly indicates other meanings.

For another example, depending on the context, the word "when" as used herein may be interpreted as "if" or "whether" or "while" or "in response to a determination of/that" or "in response to a detection of/that". Similarly, depending on the context, the phrase "if determined" or "if detected (a stated condition or event)" may be interpreted as "when . . . is determined" or "in response to a determination" or "when (stated condition or event) is detected" or "in response to a detection of (stated condition or event)".

Those of ordinary skill in the art will recognize that the exemplary units and algorithm acts described in connection with the implementations disclosed herein can be implemented in electronic hardware, or a combination of computer software and electronic hardware. Whether these functions are implemented in hardware or software depends on a specific application and design constraint of the technical solution. One skilled in the art may use different methods to implement the described functions for each particular application, but such implementation should not be considered to be beyond the scope of implementations of the present disclosure.

Those skilled in the art may clearly understand that for convenience and conciseness of description, the specific working process of the system, apparatus and unit described above may refer to the corresponding process in the aforementioned implementations of methods, and details are not described herein again.

In several implementations provided by the present disclosure, it should be understood that the disclosed systems, devices and methods may be implemented in other ways. For example, the device implementations described above are only illustrative, for example, the division of the units is only a logical function division, and there may be other division modes in actual implementation, for example, multiple units or components may be combined or integrated into another system, or some features may be ignored or not executed. On the other hand, the mutual coupling or direct coupling or communication connection shown or discussed may be indirect coupling or communication connection through some interfaces, devices or units, and may be in electrical, mechanical or other forms.

The units described as separated components may or may not be physically separated, and the component shown as a unit may or may not be a physical unit, i.e., it may be located in one place or may be allocated over multiple network units. Parts or all of the units can be selected according to actual needs to achieve the purpose of the implementations of the present disclosure.

In addition, various functional units in the implementations of the present disclosure may be integrated in one processing unit, or various units may be presented separately in a physical way, or two or more units may be integrated in one unit.

The function units may be stored in a computer readable storage medium if realized in a form of software functional units and sold or used as a separate product. Based on this understanding, the technical solutions of the implementations of the present disclosure, in essence, or the part contributing to the related art, or the part of the technical solutions, may be embodied in the form of a software product stored in a storage medium, including several instructions for causing a computer device (which may be a personal computer, a server, or a network device, etc.) to perform all or parts of the acts of the methods described in various implementations of the present disclosure. The aforementioned storage medium includes a medium capable of storing program codes, such as, a U disk, a mobile hard disk, a read-only memory (ROM), a magnetic disk or an optical disk, etc.

What are described above are merely the specific implementations of the implementations of the present disclosure, but the protection scope of the implementations of the present disclosure is not limited thereto. Any change or substation that can be easily conceived by a person skilled in the art within the technical scope disclosed by the implementations of the present disclosure shall be included within the protection scope of the implementations of the present disclosure. Therefore, the scope of protection of the implementations of the present disclosure should be subject to the scope of protection of the claims.

What is claimed is:

1. A power allocation method, applied to a first device, wherein the first device supports data transmission through N carriers on a sidelink, and the method comprises:
   determining, by the first device, service priority levels of N1 carriers of the N carriers are less than a threshold;
   determining, by the first device, from the N carriers, N2 carriers and a transmission power of each of the N2 carriers, wherein a total transmission power of the N2 carriers is less than or equal to a maximum transmission power of the first device; and
   sending, by the first device, a service on a corresponding carrier to a second device according to the transmission power of each of the N2 carriers,
   wherein determining, by the first device, from the N carriers, the N2 carriers and the transmission power of each of the N2 carriers comprises:
   determining, by the first device, the N2 carriers according to a following way until a remaining transmission power of the first device is zero, or until all of the N carriers are added to an available carrier set:

determining, by the first device, a first carrier of which a service priority level is lowest in a candidate carrier set;

when a transmission power of the first carrier is greater than or equal to the remaining transmission power, determining, by the first device, the remaining transmission power as a transmission power of the first carrier, wherein the remaining transmission power is equal to a power obtained by subtracting a total transmission power of all carriers in the available carrier set from the maximum transmission power, adding, by the first device, the first carrier to the available carrier set, and removing the first carrier from the candidate carrier set; and when the transmission power of the first carrier is less than the remaining transmission power, adding, by the first device, the first carrier to the available carrier set, and removing the first carrier from the candidate carrier set.

2. The method according to claim 1, wherein before determining, by the first device, the N2 carriers, the method further comprises:

determining, by the first device, the candidate carrier set and the available carrier set.

3. The method according to claim 2, wherein determining, by the first device, the candidate carrier set and the available carrier set comprises: determining, by the first device, an empty set as the available carrier set, and determining the N carriers as the candidate carrier set; or determining, by the first device, the candidate carrier set and the available carrier set comprises: when a total transmission power of the N1 carriers is greater than or equal to the maximum transmission power, determining, by the first device, an empty set as the available carrier set, and determining the N1 carriers as the candidate carrier set; or determining, by the first device, the candidate carrier set and the available carrier set comprises:

when a total transmission power of the N1 carriers is less than the maximum transmission power, determining, by the first device, the N1 carriers as the available carrier set, and determining carriers except the N1 carriers in the N carriers as the candidate carrier set.

4. The method according to claim 1, wherein determining, by the first device, the first carrier of which the service priority level is lowest in the candidate carrier set comprises:

when carriers of which service priority levels are lowest in the candidate carrier set include a plurality of second carriers, determining, by the first device, the first carrier from the plurality of second carriers.

5. The method according to claim 4, wherein determining, by the first device, the first carrier from the plurality of second carriers comprises:

randomly selecting, by the first device, one carrier from the plurality of second carriers as the first carrier; or determining, by the first device, the plurality of second carriers as the first carrier.

6. The method according to claim 1, wherein determining, by the first device, from the N carriers, the N2 carriers and the transmission power of each of the N2 carriers comprises:

when a total transmission power of the N1 carriers is greater than the maximum transmission power, determining, by the first device, the N1 carriers as the N2 carriers;

determining, by the first device, the transmission power of each of the N1 carriers according to a proportional coefficient, wherein the proportional coefficient includes a proportion of the transmission power of each of the N1 carriers.

7. The method according to claim 6, wherein the proportional coefficient is a coefficient configured by a network device, or the proportional coefficient is a coefficient determined by the first device according to a service priority level of each of the N2 carriers.

8. A device supporting data transmission through N carriers on a sidelink, and the device comprising:

a processor used for: determining that service priority levels of N1 carriers of the N carriers are less than a threshold; determining, from the N carriers, N2 carriers and a transmission power of each of the N2 carriers, wherein a total transmission power of the N2 carriers is less than or equal to a maximum transmission power of the device; and a transceiver used for sending a service on a corresponding carrier to a second device according to the transmission power of each of the N2 carriers;

wherein the processor is specifically used for:

determining the N2 carriers according to a following way until a remaining transmission power of the device is zero, or until all of the N carriers are added to an available carrier set:

determining a first carrier of which a service priority level is lowest in a candidate carrier set;

when a transmission power of the first carrier is greater than or equal to the remaining transmission power, determining the remaining transmission power as a transmission power of the first carrier, wherein the remaining transmission power is equal to a power obtained by subtracting a total transmission power of all carriers in the available carrier set from the maximum transmission power, adding the first carrier to the available carrier set, and removing the first carrier from the candidate carrier set; and when the transmission power of the first carrier is less than the remaining transmission power, adding the first carrier to the available carrier set, and removing the first carrier from the candidate carrier set.

9. The device according to claim 8, wherein the processor is further used for:

determining the candidate carrier set and the available carrier set before determining the N2 carriers.

10. The device according to claim 9, wherein the processor is specifically used for:

determining an empty set as the available carrier set, and using the N carriers as the candidate carrier set.

11. The device according to claim 9, wherein the processor is specifically used for:

when a total transmission power of the N1 carriers is greater than or equal to the maximum transmission power, determining an empty set as the available carrier set, and determining the N1 carriers as the candidate carrier set.

12. The device according to claim 9, wherein the processor is specifically used for:

when a total transmission power of the N1 carriers is less than the maximum transmission power, determining the N1 carriers as the available carrier set, and determining carriers except the N1 carriers in the N carriers as the candidate carrier set.

13. The device according to claim 8, wherein the processor is specifically used for:

when carriers of which service priority levels are lowest in the candidate carrier set includes a plurality of second carriers, determining a first carrier from the plurality of second carriers.

14. The device according to claim 13, wherein the processor is specifically used for:
randomly selecting one carrier from the plurality of second carriers as the first carrier.

15. The device according to claim 13, wherein the processor is specifically used for:
determining the plurality of second carriers as the first carrier.

16. The device according to claim 8, wherein the processor is specifically used for:
when a total transmission power of the N1 carriers is greater than the maximum transmission power, determining the N1 carriers as the N2 carriers;
determining the transmission power of each of the N1 carriers according to a proportional coefficient, wherein the proportional coefficient includes a proportion of the transmission power of each of the N1 carriers.

17. The device according to claim 16, wherein the proportional coefficient is a coefficient configured by a network device, or the proportional coefficient is a coefficient determined by the device according to a service priority level of each of the N2 carriers.

18. A non-transitory computer readable medium, comprising: a computer program, wherein, the computer program includes instructions for executing acts of:
determining service priority levels of N1 carriers of the N carriers are less than a threshold;
determining from the N carriers, N2 carriers and a transmission power of each of the N2 carriers, wherein a total transmission power of the N2 carriers is less than or equal to a maximum transmission power of the first device; and
sending a service on a corresponding carrier to a second device according to the transmission power of each of the N2 carriers,
wherein determining, by the first device, from the N carriers, the N2 carriers and the transmission power of each of the N2 carriers comprises:
determining, by the first device, the N2 carriers according to a following way until a remaining transmission power of the first device is zero, or until all of the N carriers are added to an available carrier set:
determining, by the first device, a first carrier of which a service priority level is lowest in a candidate carrier set;
when a transmission power of the first carrier is greater than or equal to the remaining transmission power, determining, by the first device, the remaining transmission power as a transmission power of the first carrier, wherein the remaining transmission power is equal to a power obtained by subtracting a total transmission power of all carriers in the available carrier set from the maximum transmission power, adding, by the first device, the first carrier to the available carrier set, and removing the first carrier from the candidate carrier set; and
when the transmission power of the first carrier is less than the remaining transmission power, adding, by the first device, the first carrier to the available carrier set, and removing the first carrier from the candidate carrier set.

* * * * *